J. R. CROGAN.
CLUTCH FOR GRAIN SEPARATORS.
APPLICATION FILED OCT. 5, 1918.
1,392,403.
Patented Oct. 4, 1921.
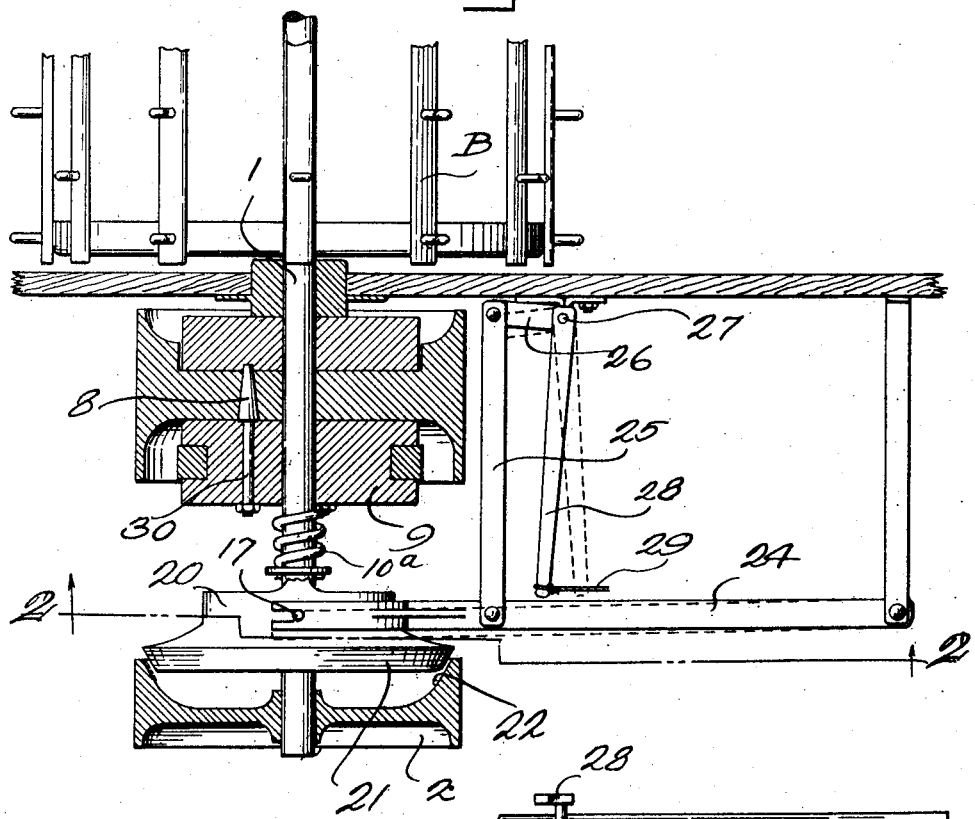
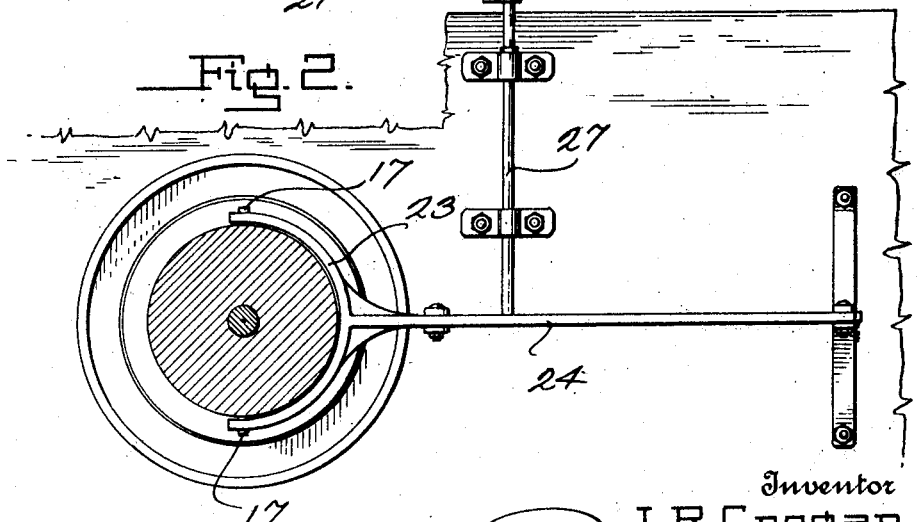
Inventor
J. R. Crogan

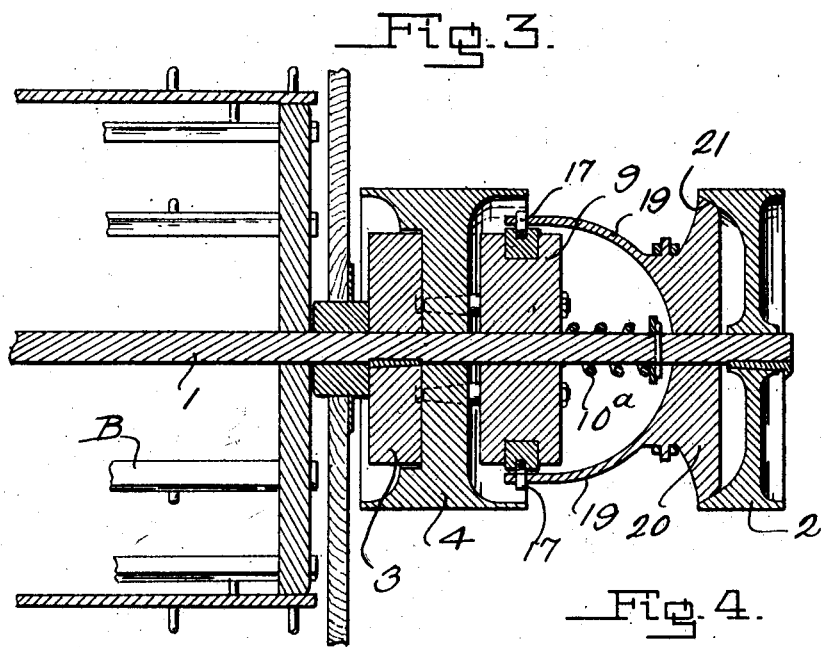
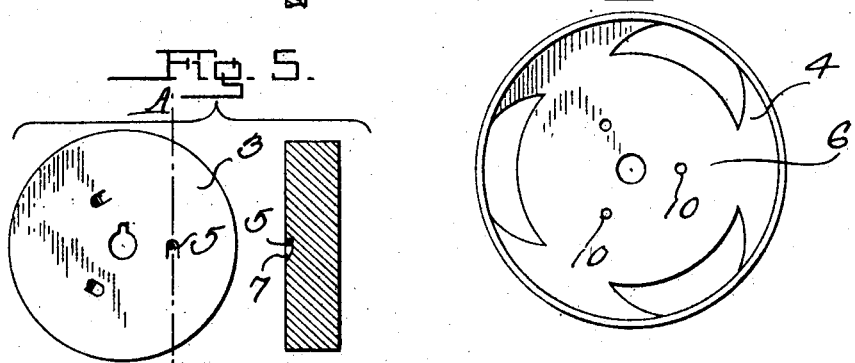

UNITED STATES PATENT OFFICE.

JACOB R. CROGAN, OF SHAUNAVON, SASKATCHEWAN, CANADA.

CLUTCH FOR GRAIN-SEPARATORS.

1,392,403.  Specification of Letters Patent.  Patented Oct. 4, 1921.

Application filed October 5, 1918. Serial No. 257,021.

*To all whom it may concern:*

Be it known that I, JACOB R. CROGAN, a citizen of Canada, and a resident of Shaunavon, in the Province of Saskatchewan and Dominion of Canada, have invented certain new and useful Improvements in a Clutch for Grain-Separators, of which the following is a specification.

This invention relates to a clutch structure particularly designed for use in connection with grain separators and an object of the invention is to provide a clutch structure associated with the main power or drive shaft of a grain separator, whereby the rotation of said shaft, and consequently the operation of the various parts of the separator may be arrested without stopping the operating engine.

In separators of approved constructions now generally in use, the power pulley through the medium of which the power is transmitted to the separator from the engine is connected to the main drive or power shaft of the separator in such manner that it is necessary to stop the operation of the engine to arrest the rotation of the shaft of the separator, which retards the proper setting or placing of the engine of the separator, when first starting a threshing job, and also makes it necessary to stop the engine in case some part of the separator is broken or becomes out of place during operation; and it is an object of this invention to provide a construction for controlling the rotation of the power shaft of the separator, whereby the operation of the various parts of the separator may be arrested without stopping the engine, in case repairs are necessary, and which will also permit movement and operation of the engine, to properly tighten the power belt, and for other purposes, during the initial setting of the machine.

More specifically, the invention comprehends the provision of a clutch structure employed in combination with the power pulley of a grain separator, which includes a clutch section keyed upon the cylinder shaft of a separator and provided with recesses for receiving operating spurs carried by a movable clutch section, which spurs are passed through the web of the power pulley to connect the said pulley directly to the shaft for rotating the shaft upon rotation of the pulley.

A further object of the invention is to provide a brake mechanism which is operated synchronously with the operation of the shiftable clutch section for applying a braking action to the blower pulley, when the movable clutch section is shifted for permitting the power pulley to rotate idly with respect to the cylinder shaft on the separator.

Other objects of the invention will appear in the following detailed description, taken in connection with the accompanying drawings, forming a part of this specification, and in which drawings:

Figure 1 is a horizontal section through the facing clutch device showing parts thereof in plan.

Fig. 2 is a section on the line 2—2 of Fig. 1.

Fig. 3 is a longitudinal section through the device taken on a plane at right angles to the section of Fig. 1.

Fig. 4 is a side elevation of the power pulley.

Fig. 5 shows a side elevation of the keyed clutch section and a section on the line $a$—$a$ thereof.

Fig. 6 shows a side and edge elevation of the shiftable clutch section, and

Fig. 7 shows a side elevation of a member employed for connecting the brake to the shiftable clutch section.

Referring more particularly to the drawings, wherein like characters indicate like and corresponding parts, the cylinder of an ordinary grain separator is generically indicated by the letter B and the main power shaft 1 of the separator is connected to this cylinder B for rotating the same. The shaft 1 has the usual pulley 2 keyed upon the outer end thereof about which pulley the blower belt is adapted to pass. The shaft 1 has a clutch section 3 keyed thereon, which clutch section is positioned within the rim of the power pulley 4 and is provided with recesses 5 in its side which faces the web 6 of the pulley 4. The recesses 5 have one side tapering as shown at 7 to permit the inner end of the clutch spurs 8 to move into the recesses for connecting the keyed clutch section 3 to the shiftable clutch section 9 which carries the spurs 8. The web 6 of the power pulley 4 is provided with openings 10 through which the spurs 8 extend, thereby connecting the keyed clutch section 3, shiftable clutch section 9, and the pulley 4 for unitary rotation. The shiftable clutch section 9 is normally held in operative connection to the clutch section 3 by a spiral spring 10ᵃ which is coiled about the shaft 1 and engages against the outer surface of the shiftable clutch section.

The shiftable clutch section 9 is provided with an annular channel 11 which receives therein a split coupling ring 12 formed of two sections 13 and 14 which are connected by means of bolts 15 and radial ears 16. Pins 17 are carried by the split ring 12 at diametrically opposed points and they are connected to a pair of arms 19. The arms 19 are formed upon a friction cone 20 the beveled periphery 21 of which frictionally engages the corresponding beveled surface 22 of the inner periphery of the blower pulley 2 for arresting rotation of this pulley and consequently of the shaft 1 when the clutch section 9 is shifted for moving the spurs 8 out of the recesses 5 and to allow the pulley 4, and clutch section 9 to rotate idly upon the shaft 1, thereby preventing the rotation of the shaft 1 by momentum.

The forked end 23 of a pivotally mounted lever 24 is connected to the friction cone 20 and it has an arm 25 connected thereto intermediate its end. The arm 25 is in turn connected by means of a link 26 to a pin 27. An operating lever 28 is connected to the pin 27 for rocking the link 26, and arm 25 to move the lever 24 upon its pivot for shifting the friction cone 20, and consequently shifting the clutch section 9, thereby operating the clutch and friction brake in unison for applying the brake synchronously with the movement of the clutch section 9 into an inoperative position or for moving the clutch cone 20 out of a braking position upon movement of the shiftable clutch section into an operative position. A cable, rope, or analogous structure indicated at 29 may be attached to the lever 28 and extend to any convenient place for operation by the man who has charge of the separator so that in case of accident, the operation of the various parts of the separator may be immediately arrested without necessitating the stopping of the engine which propels the separator mechanism.

The spurs 8 are substantially conical-shape, having bolt shanks 30 formed thereupon which extend through the clutch section 9 for rigidly connecting the spurs to the clutch section, and the split ring structure 12 is rotatably seated in the channel 11 to permit rotation of the clutch section 9 without imparting rotation to the friction or brake cone 20.

Changes in details may be made without departing from the spirit of the invention, but;

I claim:

1. In combination, a grain separator element, a drive shaft therefor, blower actuating means fixedly driven by said pulley shaft, a driver loose on said pulley shaft, a clutch for engaging the driver with said pulley shaft, and brake means adapted to bind against said blower actuating means when the clutch is released whereby to simultaneously arrest the action of the blower and said separator element.

2. In combination, a separator element, a drive shaft therefor, a blower pulley fixed on said pulley shaft, a drive pulley loosely mounted on said drive shaft, a clutch for connecting said drive pulley with the drive shaft, yieldable means for urging said clutch into coupled position, a brake secured to move with said clutch and adapted to bind against said blower pulley when the clutch is disconnected whereby to simultaneously discontinue the action of the blower and arrest the movement of said separator element, and manual means for shifting said clutch and brake in opposition to the influence of said yieldable means.

3. In combination, a shaft, a drive pulley loose thereon and composed of a web and rim, said web being recessed on opposite sides and provided with openings therethrough, a clutch element fast on the shaft situated at one side of the web and within one of the recesses, said clutch element provided with depressions having abrupt walls at one end and inclined walls at their other ends, a movable clutch element on the shaft at the other side of the web shiftable in the opposite recess of the pulley and provided with pins engaging through the openings in said web and adapted to enter the notches in the first mentioned web element, a relatively stationary ring carried by said shiftable clutch element and having pins projecting therefrom, arms engaging said pins, a friction brake element moving with said arms, yieldable means for urging said movable clutch element into clutching position, manual means for moving said shiftable clutch element in the opposite direction, and a pulley fast on the shaft having a friction face adapted to operatively receive said brake element when the clutch is disengaged.

4. In combination, a rotatable shaft, a pulley thereon having a web made with recesses at opposite sides thereof and a series of conical openings therethrough being concentric with the shaft, a clutch element fixed to the shaft at one side of the pulley web and situated in one of the recesses, a shiftable clutch element situated at the opposite side of the web and loose on the shaft, said shiftable clutch element adapted to slide in the recess at the other side of the web, a concentric series of conical pins projecting from said shiftable clutch element slidably entering the conical openings in said web, said first mentioned fixed clutch element having notches to receive the reduced ends of said tapered pins, a ring carried by said shiftable clutch element and adapted to move relatively thereto, said ring provided with pins projecting therefrom, a pair of arms fixedly engaging with said pins, a friction brake element made in one piece with said arms and provided with pins extending therefrom, a coil spring wound about said shaft and bearing against said shiftable clutch element for urging the same into coupling position, a second pulley fixed on said shaft and having a braking surface arranged to receive the friction brake element, a forked lever engaging the pins on said braking element, and manual means for shifting said forked lever.

JACOB R. CROGAN.